Patented July 12, 1932

1,867,105

UNITED STATES PATENT OFFICE

KARL SCHIRMACHER, OF FRANKFORT-ON-THE-MAIN-HOCHST, AND HANS SCLICHENMAIER, OF KELKHEIM IN TAUNUS, GERMANY, ASSIGNORS TO GENERAL ANILINE WORKS, INC., OF NEW YORK, N. Y., A CORPORATION OF DELAWARE

NEW PROCESS FOR PREPARING P-NITROSO-AMINE COMPOUNDS OF THE AROMATIC SERIES AND THE COMPOUNDS OBTAINABLE THEREBY

No Drawing. Application filed August 27, 1930, Serial No. 478,308, and in Germany September 14, 1929.

The present invention relates to a new process for preparing p-nitroso-amine-compounds of the aromatic series and to the new compounds obtainable thereby.

We have found that p-nitroso-amine compounds of the aromatic series are obtainable by causing nitrous acid to act in the presence of oleum or of a concentrated sulfuric acid of at least 85% strength at a low temperature, preferably at about −20° C. up to +30° C. upon an aromatic amine of the following general formula:

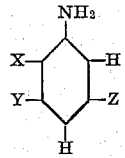

wherein X either represents an alkyl group in which case one of the substituents; Y and Z represent alkyl, the other being hydrogen; or X and Y represent jointly one of the two four-membered groups:

$$-CH_2-CH_2-CH_2-CH_2-$$

or $$-CH=CH-CH=CH-$$

in which case; Z represents hydrogen.

In our process one may preferably use instead of free nitrous acid sodium nitrite or nitrosyl-sulfuric acid.

The new compounds obtainable by our process are most probably p-nitroso-amine- or p-quinonoximimine compounds which can be represented by one of the following general formulæ:

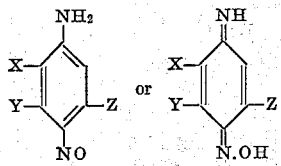

wherein X either represents an alkyl group in which case one of the substituents; Y and Z represent alkyl, the other being hydrogen; or X and Y represent jointly one of the two four-membered groups;

$$-CH_2-CH_2-CH_2-CH_2-$$

or $$-CH=CH-CH=CH-$$

in which case; Z represents hydrogen.

It may be mentioned that in our process the new products are obtainable primarily in the form of their sulfuric acid salts from which the free compounds are obtainable by a suitable treatment with an alkali, such as, for instance, sodium carbonate.

The new compounds are very reactive and represent valuable intermediate products for the manufacture of dyestuffs. By condensing them with aromatic amines, they yield intensely red-colored products; by reducing them, they are converted into para-diamines or aminohydroxy compounds and by saponifying them, they are transformed into quinonoximes. The process can very easily be carried out on an industrial scale and it, therefore, constitutes an important technical progress.

The following examples serve to illustrate the invention, but they are not intended to limit it thereto, the parts being by weight:

(1) 28 parts of finely pulverized, well dried sodium nitrite are introduced at 5° C., while stirring, into a solution of 24.2 parts of 1-amino 2.5-dimethylbenzene in 200 parts of sulfuric acid of 66° Bé. The temperature of the reaction mixture is raised to about 10° C.–20° C. and maintained for about 24 hours. Thereafter, the mixture is poured on ice whereby a crystalline precipitate separates. It is filtered with suction and dried in vacuo at 50° C. The new compound is obtained in the form of feebly yellowish-colored crystals which are readily soluble in water and alcohol, but scarcely soluble in most of organic solvents. It has the following constitution:

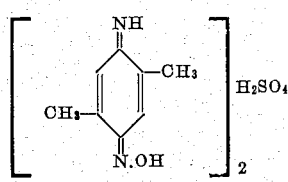

It decomposes at about 125° C. On dissolving the product in water and adding a solution of sodium carbonate, there immediately separate greenish-yellow crystals which, recrystallized from xylene, melt at 183° C. with decomposition and represent the 1-amino-4-nitroso-2.5-dimethylbenzene of the following formula:

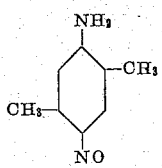

(2) 24.2 parts of 1-amino-2.3-dimethylbenzene are dissolved in 250 parts of fuming sulfuric acid containing 10% of sulfuric anhydride and treated as described in Example 1. There are obtained intensely yellowish-colored crystals which decompose at 182° C. They are rather difficultly soluble in water and alcohol and nearly insoluble in hydrocarbons. The new compound has the following constitution:

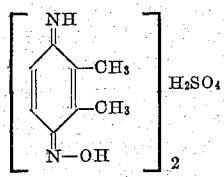

Its aqueous suspension is digested with a solution of sodium carbonate and there are obtained intensely greenish-yellow crystals which crystallize from xylene in the form of laminæ having a bluish-green luster. The crystals decompose at about 194° C. The compound is moderately soluble in alcohol and xylene. It dissolves in alcohol to an intensely green solution and in concentrated sulfuric acid to a yellow solution. The new compound, the 1-amino-4-nitroso-2.3-dimethylbenzene, has the following formula:

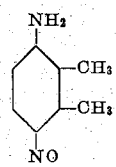

(3) 100 parts of 1-amino-5.6.7.8-tetrahydronaphthalene are dissolved in 1000 parts of concentrated sulfuric acid, 70 parts of sodium nitrite are added at −10° C. and the whole is treated as described in Example 1. There is obtained a yellow crystalline compound. It is difficultly soluble in water and nearly insoluble in hydrocarbons. It decomposes at about 190° C. It corresponds with the following constitution:

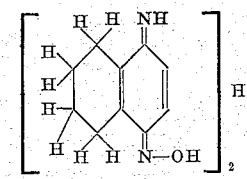

On suspending the compound in ice water and adding a solution of acetate of sodium, there is obtained a brownish-red precipitate which after a few minutes changes into greenish-yellow crystals decomposing at 126° C. The new product, the 1-amino-4-nitroso-5.6.7.8-tetrahydronaphthalene, corresponds with the following formula:

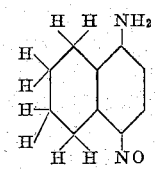

(4) 143 parts of α-naphthylamine are dissolved in 1000 parts of sulfuric acid of 66° Bé. and 100 parts of dry, powdered sodium nitrite are added at −10° C. After some time the mass solidifies into a thick magna which is no longer cooled and allowed to stand for 12 hours at about 5° C.–10° C. Thereupon, the whole is poured on ice and filtered. There is obtained a yellowish-green product which dissolves very difficultly in water and the usual solvents. The new compound corresponds with the following formula:

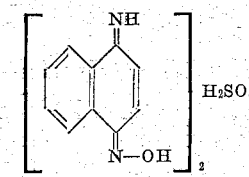

By digesting the aqueous suspension of the new compound for a prolonged time with sodium acetate there is obtained an intensely reddish-brown compound. In order to purify it entirely, it is taken up in very diluted hydrochloric acid; any undissolved matter is filtered off and the ice-cold solution is again precipitated by means of sodium carbonate. It represents a brown-red crystalline powder which decomposes at 150° C. By addition of hydrochloric acid the hydrochloride is obtained in the form of yellowish-green crystals, which are soluble in water much more easily than the sulfuric acid salt. The hydrochloride decomposes at 221° C. and has the following formula:

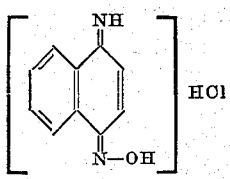

(5) A solution of 28.6 parts of α-naphthylamine in 200 parts of concentrated sulfuric acid is run within short time at −10° C., while stirring, into nitrosyl sulfuric acid obtained from 200 parts of fuming sulfuric acid of 10% strength and 21 parts of sodium nitrite. Stirring is continued for about 4 hours, the whole is poured on ice and filtered with suction. The product thus obtained is identical with the final product obtained according to Example 4.

We claim:

1. The process which comprises causing nitrous acid to act at a temperature from −20° C. up to +30° C. and in the presence of concentrated sulfuric acid of at least 85% strength upon an aromatic amine of the following general formula:

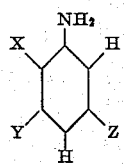

wherein X either represents a methyl group in which case one of the substituents; Y and Z represent methyl, the other being hydrogen; or X and Y represent jointly one of the two four-membered groups:

$$-CH_2-CH_2-CH_2-CH_2-$$
or
$$-CH=CH-CH=CH-$$

in which case; Z represents hydrogen.

2. The process which comprises causing nitrous acid to act upon α-naphthylamine at a temperature from −20° C. up to +30° C. in the presence of concentrated sulfuric acid of at least 85% strength.

3. As a new compound, 1.4-naphthoquinonoximimine being in the dry state a brown-red powder which decomposes at a temperature of 150° C.

4. As new products, the compounds corresponding with one of the following formulæ:

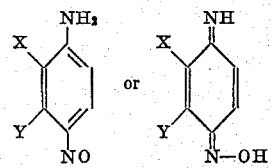

wherein X and Y represent methyl or jointly one of the two four-membered groups:

$$-CH_2-CH_2-CH_2-CH_2-$$
or
$$-CH=CH-CH=CH-,$$

the said compounds, on condensation with aromatic amines, yielding intensely red-colored products and, on reduction, being converted into para-diamines or aminohydroxy compounds.

5. The process which comprises causing nitrous acid to act upon 1-amino-5.6.7.8-tetrahydronaphthalene at a temperature from −20° C. up to +30° C. in the presence of concentrated sulfuric acid of at least 85% strength.

6. The process which comprises causing nitrous acid to act upon 1-amino-2.3-dimethylbenzene at a temperature from −20° C. up to +30° C. in the presence of concentrated sulfuric acid of at least 85% strength.

7. As a new compound, 1-amino-4-nitroso-5.6.7.8-tetrahydronaphthalene, being greenish-yellow crystals which decompose at 126° C.

8. As a new compound, 1-amino-4-nitroso-2.3-dimethylbenzene, being greenish-yellow crystals which decompose at about 194° C.

In testimony whereof, we affix our signatures.

KARL SCHIRMACHER.
HANS SCHLICHENMAIER.